United States Patent
Kim et al.

(10) Patent No.: US 10,863,017 B2
(45) Date of Patent: *Dec. 8, 2020

(54) APPARATUS AND METHOD FOR AUTOMATIC CALL RECEIVING AND SENDING DEPENDING ON USER POSTURE IN PORTABLE TERMINAL

(71) Applicant: Samsung Electronics Co., Ltd, Suwon-si (KR)

(72) Inventors: Hyoung-Il Kim, Seongnam-si (KR); Tae-Jun Park, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,126

(22) Filed: Sep. 5, 2019

(65) Prior Publication Data

US 2019/0394324 A1    Dec. 26, 2019

Related U.S. Application Data

(63) Continuation of application No. 16/037,918, filed on Jul. 17, 2018, now Pat. No. 10,425,524, which is a
(Continued)

(30) Foreign Application Priority Data

May 4, 2009    (KR) ........................ 10-2009-0038863

(51) Int. Cl.
*H04M 1/725*    (2006.01)
*G06F 1/16*    (2006.01)
*H04W 68/00*    (2009.01)

(52) U.S. Cl.
CPC ...... *H04M 1/72563* (2013.01); *G06F 1/1694* (2013.01); *H04M 1/72519* (2013.01); *H04M 2250/12* (2013.01); *H04W 68/00* (2013.01)

(58) Field of Classification Search
CPC .......... H04M 1/72563; H04M 1/72519; G06F 1/1694; H04W 68/00
(Continued)

(56) References Cited

U.S. PATENT DOCUMENTS 6,154,538 A    11/2000 Nakano
6,498,600 B1    12/2002 Vance et al.
(Continued)

FOREIGN PATENT DOCUMENTS

KR        20020006064 A    1/2002
KR    10-2004-0051202 A    6/2004
(Continued)

OTHER PUBLICATIONS

International Search Report dated Dec. 15, 2010 in connection with International Application No. PCT/KR2010/002848, 3 pages.
(Continued)

*Primary Examiner* — Lee Nguyen

(57) ABSTRACT

A method of receiving a call by recognizing a posture of a user in a portable terminal is provided. The method includes identifying whether a call reception event occurs, detecting a motion in which the user brings the portable terminal to an ear by using a posture detecting sensor, when the call reception event occurs, and connecting the call upon detecting the motion.

20 Claims, 8 Drawing Sheets

Related U.S. Application Data continuation of application No. 15/360,974, filed on Nov. 23, 2016, now Pat. No. 10,038,776, which is a continuation of application No. 14/731,041, filed on Jun. 4, 2015, now Pat. No. 9,521,242, which is a continuation of application No. 14/320,310, filed on Jun. 30, 2014, now Pat. No. 9,071,699, which is a continuation of application No. 13/319,060, filed as application No. PCT/KR2010/002848 on May 4, 2010, now Pat. No. 8,768,325.

(58) Field of Classification Search
USPC .................. 455/418, 564, 567; 345/158
See application file for complete search history.

(56) References Cited

U.S. PATENT DOCUMENTS

| | | |
|---|---|---|
| 8,768,325 B2 | 7/2014 | Kim et al. |
| 9,071,699 B2 | 6/2015 | Kim et al. |
| 10,038,776 B2 | 7/2018 | Kim et al. |
| 10,425,524 B2 * | 9/2019 | Kim .................. H04M 1/72519 |
| 2002/0167488 A1 | 11/2002 | Hinckley et al. |
| 2005/0064913 A1 | 3/2005 | Kim |
| 2006/0052109 A1 | 3/2006 | Ashman, Jr. et al. |
| 2007/0036347 A1 | 2/2007 | Teicher |
| 2008/0212753 A1 | 9/2008 | Yoshizawa |

FOREIGN PATENT DOCUMENTS

| | | |
|---|---|---|
| KR | 10-2005-0060923 A | 6/2005 |
| KR | 10-2005-0096688 A | 10/2005 |
| KR | 10-2006-0114541 A | 11/2006 |
| KR | 10-2009-0005807 A | 1/2009 |
| KR | 10-2009-0021895 A | 3/2009 |

OTHER PUBLICATIONS

Written Opinion of International Searching Authority dated Dec. 15, 2010 in connection with International Application No. PCT/KR2010/002848, 4 pages.

Notice of Patent Grant dated Mar. 23, 2015 in connection with Korean Patent Application No. 10-2009-0038863, 7 pages.

* cited by examiner

```
//Pseudo code
If(phone call signal detected)
{
  Do
  {
    X(t) = x axis accelerometer data
    Y(t) = y axis accelerometer data
    Z(t) = z axis accelerometer data
    L(t) = luminance sensor data A = | L(t) – L(t–5) | // the delta value of luminance / 100ms
    If (A > LUMINANCE_DETLA_LIMIT & L(t) < LUMINANCE_REFERENCE // IN CASE THE LUMINANCE SENSOR EXISTS
      If(X(t) > 0 AND |Z(t)| < 100)
        If(pattern matching data sample X(t–20,,,t), Y(t–20,,,t), Z(t–20,,,t) with one or more phone
    receiving log data for given)
          Execute the phone call function t = t + 1 // sleep for 20ms
  } Until (a call is missing or user catch a call by pushing a button)
}
```

FIG.7

```
//Pseudo code
If(phone call signal detected)
{
  Do
  {
    X(t) = x axis accelerometer data
    Y(t) = y axis accelerometer data
    Z(t) = z axis accelerometer data dX = SUM(|X(t) – X(t–1)|)
    dY = SUM(|Y(t) – Y(t–1)|)
    dZ = SUM(|Z(t) – X(t–1)|)
    If (STANDARD DEVIATION (dX,dY,dZ) < STABLE_LIMIT) // IN CASE THE LUMINANCE SENSOR
                                                      DOES NOT EXIST
      If ( X(t) > 0 AND |Z(t)| < 100)
        If (pattern matching data sample X(t–20,,,t),Y(t–20,,,t),Z(t–20,,,t) with one or more
            phone receiving log data for given)
          Execute the phone call function t = t + 1 // sleep for 20ms
  } Until (a call is missing or user catch a call by pushing a button)
}
```

FIG.8

APPARATUS AND METHOD FOR AUTOMATIC CALL RECEIVING AND SENDING DEPENDING ON USER POSTURE IN PORTABLE TERMINAL

CROSS-REFERENCE TO RELATED APPLICATIONS

This application is a continuation of U.S. patent application Ser. No. 16/037,918 filed on Jul. 17, 2018, which is a continuation of U.S. patent application Ser. No. 15/360,974 filed on Nov. 23, 2016, which is a continuation of U.S. patent application Ser. No. 14/731,041 filed on Jun. 4, 2015, which is a continuation of U.S. patent application Ser. No. 14/320,310 filed on Jun. 30, 2014, which is a continuation of U.S. patent application Ser. No. 13/319,060 filed on Jan. 16, 2012, which is a 371 of International Patent Application No. PCT/KR2010/002848 filed on May 4, 2010, which claims priority to Korean Patent Application No. 10-2009-0038863 filed on May 4, 2009, the disclosures of which are herein incorporated by reference in their entirety.

BACKGROUND

1. Field

The present invention relates to an apparatus and a method for automatically receiving and transmitting a call in a portable terminal by recognizing a user posture.

2. Description of the Related Art

Generally, in order to transmit or receive a call, a user needs to press a button of a portable terminal or directly touch a screen of the portable terminal. However, the portable terminal having a touch function may not have a physical button, and thus, the user needs to view a displayed screen in order to perform a precise touch operation.

Normally, it is explicit when the user presses a SEND button or touches a specific area to send or receive a call; however, a more convenient function can be provided to the user if the above approach to press the SEND button or touch the specific area can be more simplified.

SUMMARY

An aspect of the present invention is to solve at least the above-mentioned problems and/or disadvantages and to provide at least the advantages described below. Accordingly, an aspect of the present invention is to provide an apparatus and a method for automatically receiving and sending a call in a portable terminal by identifying a user posture.

Another aspect of the present invention is to provide an apparatus and a method for receiving and sending a call by detecting a user gesture of bringing a portable terminal to the user's ear.

In accordance with an aspect of the present invention, a method of receiving a call by recognizing a posture of a user in a portable terminal is provided. The method includes identifying whether a call reception event occurs, detecting a motion in which the user brings the portable terminal to an ear by using a posture detecting sensor, when the call reception event occurs, and connecting the call upon detecting the motion.

In accordance with another aspect of the present invention, a method of originating a call by recognizing a posture of a user in a portable terminal is provided. The method includes identifying whether a number to call is entered, detecting a motion in which the user brings the portable terminal to an ear by using a posture detecting sensor, when the number to call is entered, and originating the call upon detecting the motion.

In accordance with another aspect of the present invention, an apparatus for receiving a call by recognizing a posture of a user in a portable terminal is provided. The apparatus includes a posture detecting sensor and a controller configured to identify whether a call reception event occurs and, when the call reception event occurs, configured to detect a motion in which the user brings the portable terminal to an ear by using the posture detecting sensor and configured to connect the call upon detecting the motion.

In accordance with another aspect of the present invention, an apparatus for originating a call by recognizing a posture of a user in a portable terminal is provided. The apparatus includes a posture detecting sensor and a controller configured to identify whether a number to call is entered and, when the number to call is entered, configured to detect a motion in which the user brings the portable terminal to an ear by using the posture detecting sensor and configured to originate the call to the number to call.

BRIEF DESCRIPTION OF THE DRAWINGS

The above and other aspects, features and advantages of certain exemplary embodiments of the present invention will be more apparent from the following detailed description taken in conjunction with the accompanying drawings, in which:

FIG. 7 is a view illustrating a pseudo code for detecting a motion in which a user brings a portable terminal to the user's ear by using an accelerometer sensor and a luminance sensor in a portable terminal according to an exemplary embodiment; and FIG. 8 is a view illustrating a pseudo code for detecting a motion in which a user brings a portable terminal to the user's ear by using an accelerometer sensor in a portable terminal according to an exemplary embodiment.

DETAILED DESCRIPTION

Exemplary embodiments of the present invention will be described herein below with reference to the accompanying drawings. Also, in the following description, well-known functions or constructions are not described in detail since they would obscure the invention in unnecessary detail.

Hereinafter, an apparatus and a method for automatically receiving and sending a call by recognizing a user posture in a portable terminal according to the present invention will be described below.

The present invention automatically sends or receives a call by detecting a user' motion of bringing a portable terminal to the user's ear or a state in which the portable terminal is brought and placed to the user's ear by using a posture detecting sensor such as an accelerometer sensor, a terrestrial magnetic sensor, a pressure sensor, a proximity sensor, or a sensor.

Figure 1:
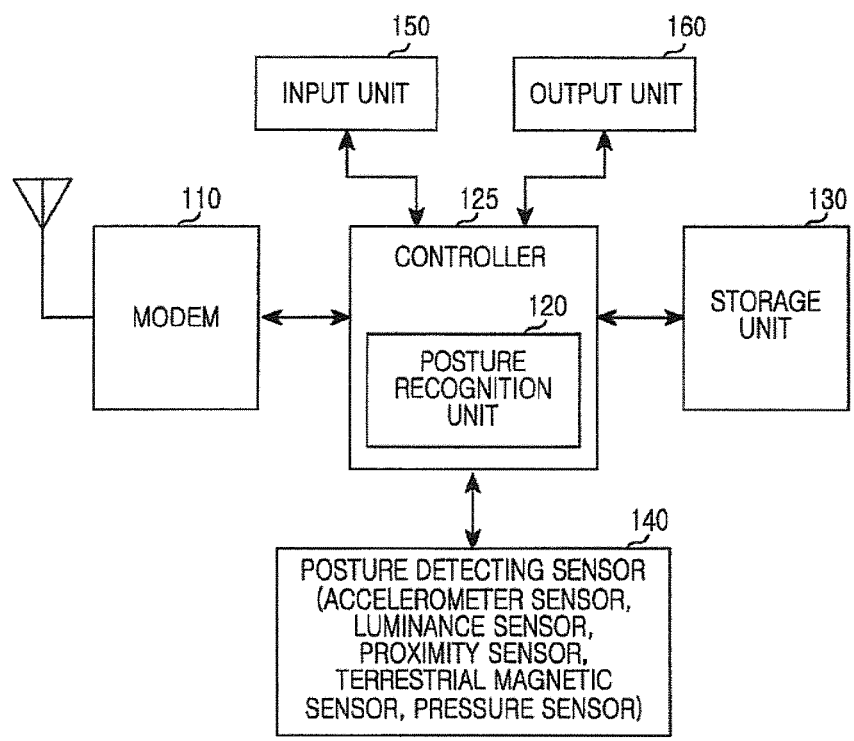
FIG. 1 is a view illustrating a block configuration of a portable terminal according to an exemplary embodiment of the present invention.

FIG. 1 is a perspective view illustrating a portable terminal according to an exemplary embodiment of the present invention.

Referring to FIG. 1, the portable terminal includes a modem 110, a posture recognition unit 120, a controller 125, a storage unit 130, a posture detecting sensor 140, an input unit 150, and an output unit 160.

The modem 110 is a module for communicating with other terminal and includes a wireless processing unit and a baseband processing unit. The wireless processing unit converts a signal received through an antenna to a baseband signal to be provided to the baseband processing unit and converts a baseband signal from the baseband processing unit to a radio signal to be transmitted over an actual radio path and sends the converted radio signal through the antenna.

The controller 125 controls an overall operation of the portable terminal. In particular, the controller 125 controls the posture detecting sensor 140 and the posture recognition unit 120 according to the present invention.

The storage unit 130 performs a function to store a program for controlling the overall operation of the portable terminal and temporary data generated during execution of the program.

The posture detecting sensor 140 includes a luminance sensor, the proximity sensor, the accelerometer sensor, the geo-magnetic sensor, or the pressure sensor, and outputs a movement determination value when a motion of the portable terminal occurs.

The input unit 150 is configured to include a touch screen or a keypad and provides a user input to the controller 125. Also, the output unit 160 is configured to include a speaker, a vibration motor, or a liquid crystal display (LCD) screen, and provides an output from the portable terminal in a form of a sound, vibration, or screen display.

When a telephone number to call is entered through the input unit 150, the posture recognition unit 120 loads the entered telephone number on the memory. Next, when the user moves the portable terminal, i.e., a data is outputted from the posture detecting sensor 140, the posture recognition unit 120 analyzes an output data from the posture detecting sensor 140.

When an analysis result of the output data of the posture detecting sensor 140 indicates that the user brings the portable terminal to the user's ear to send a call or brings and places the portable terminal to the user's ear, the posture recognition unit 120 sends the call to the entered telephone number.

When a data is outputted from the posture detecting sensor 140 but the analysis result of the output data indicates that the user presses a SEND button, instead of the user' motion of bringing the portable terminal to the user's ear or the state in which the portable terminal is brought and placed to the user's ear for call origination, the posture recognition unit 120 originates the call to the entered telephone number.

When a call receipt event occurs in the portable terminal (here, the call receipt event indicates a case in which an event for alerting an incoming call such as a ring tone, vibration, a flashing lamp, or a screen display that signals the incoming call in the portable device is generated in the portable terminal), the posture recognition unit 120 identifies whether a data is outputted from the posture detecting sensor 140.

When the analysis result of the output data of the posture detecting sensor 140 indicates that the user brings the portable terminal to the user's ear or brings and places the portable terminal to the user's ear for call receipt, the posture recognition unit 120 connects the call.

When the analysis result of the output data of the posture detecting sensor 140 does not indicate, although the user moves the portable terminal, the user' motion of bringing the portable terminal to the user's ear or the state in which the portable terminal is brought and placed to the user's ear for call receipt but indicates that the user pressed a bottom of the portable terminal, the posture recognition unit 120 connects the call.

In the above-mentioned block configuration, the controller 125 can perform a function of the posture recognition unit 120. In the present invention, the posture recognition unit 120 is illustrated as a separate unit in order to explain each function separately.

Thus, when embodied in a real product, all of functions of the posture recognition unit 120 can be performed by the controller 125 or, alternatively, only a part of the functions described above can be performed by the controller 125. A detailed operation of the controller 125 will be described below.

Figure 2:
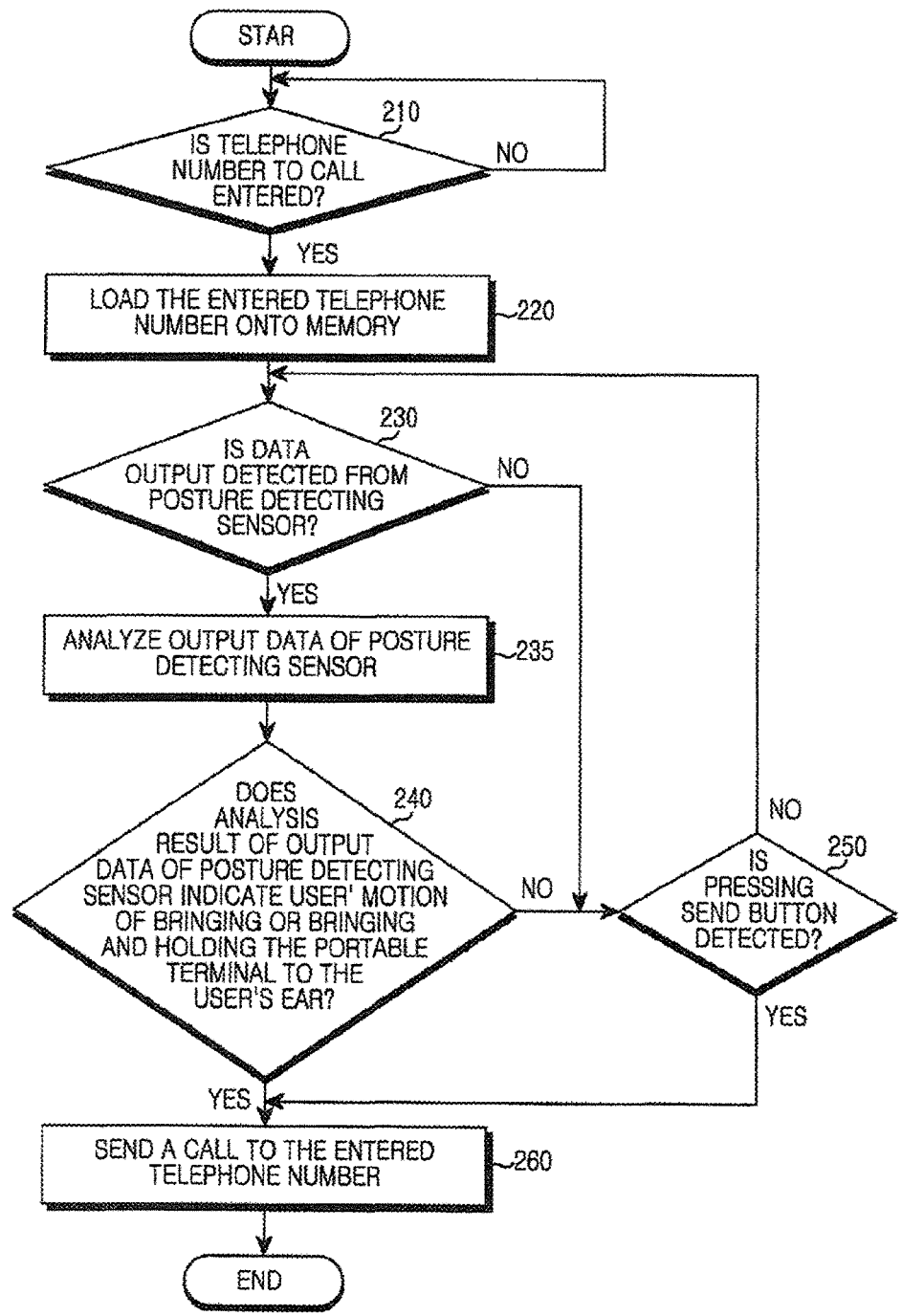
FIG. 2 is a flow chart illustrating a process of sending a call by using a posture detecting sensor in a portable terminal according to an exemplary embodiment of the present invention.

FIG. 2 is a flow chart illustrating a process of sending a call by using a posture detecting sensor in a portable terminal according to an exemplary embodiment of the present invention.

Referring to FIG. 2, when the telephone number to call is entered from the user (step 210), the controller loads the entered telephone number onto the memory (step 220).

Next, when a data output is detected by the posture detecting sensor of the portable terminal (step 230), i.e., a movement of the portable terminal is detected, the controller analyzes the output data of the posture detecting sensor (step 235).

Next, when the analysis result of the output data of the posture detecting sensor indicates the user' motion of bringing the portable terminal to the user's ear or the state in which the portable terminal is brought and placed to the user's ear (step 240), the controller sends the call to the entered telephone number (step 260).

If the data output is not detected by the posture detecting sensor of the portable terminal (step 230) but the SEND button is detected to be pressed (step 250), the controller sends the call to the entered telephone number (step 260).

When, although the data output is detected by the posture detecting sensor of the portable terminal (step 230), the analysis result (step 235) of the output data of the posture detecting sensor does not indicate the user' motion of bringing the portable terminal to the user's ear or the state in which the portable terminal is brought and placed to the user's ear for call origination (step 240), but indicates the SEND button being pressed (step 250), the controller sends the call to the entered telephone number (step 260).

Figure 3:
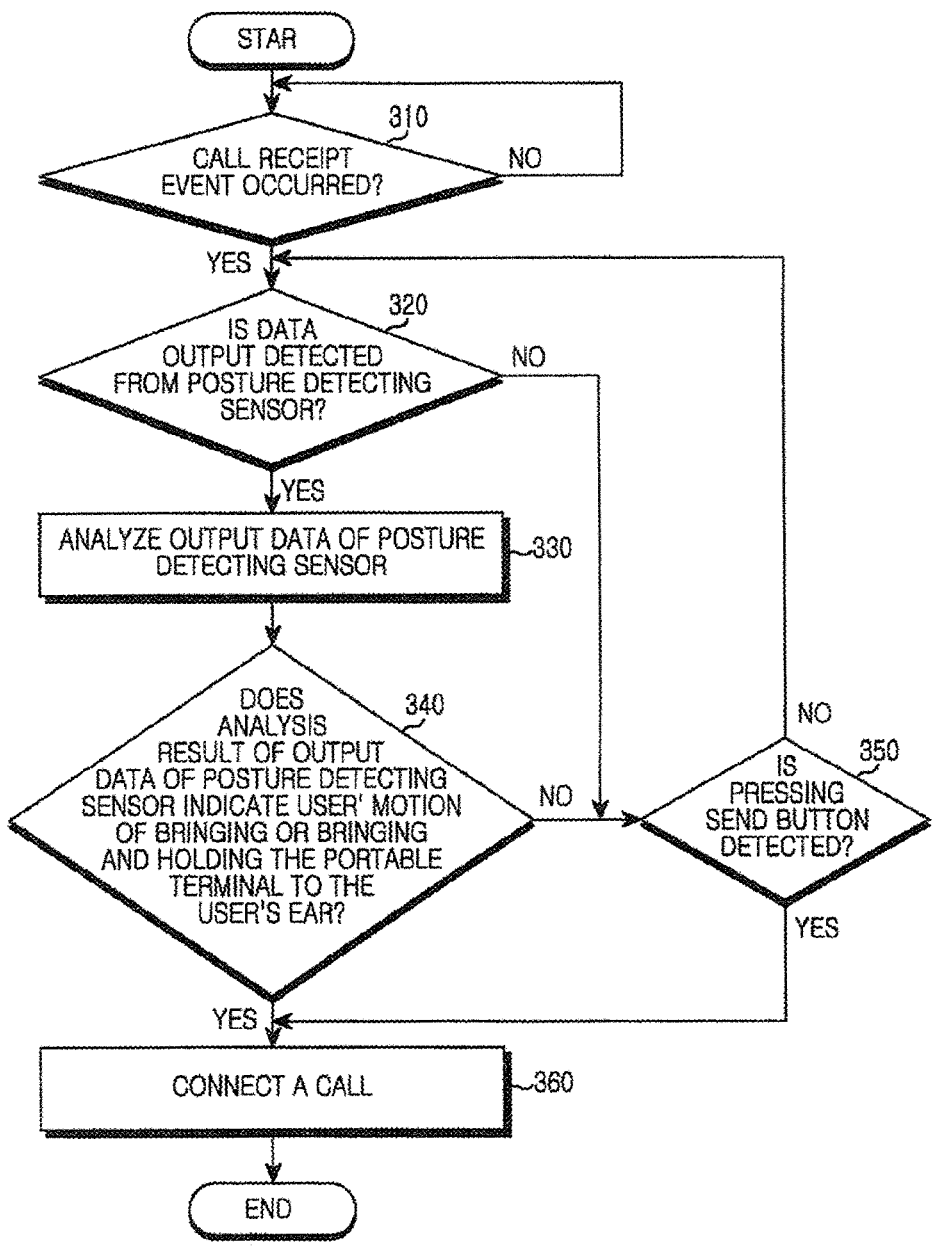
FIG. 3 is a flow chart illustrating a process of receiving a call by using a posture detecting sensor in a portable terminal according to an exemplary embodiment of the present invention.

FIG. 3 is a flow chart illustrating a process of receiving a call by using a posture detecting sensor in a portable terminal according to an exemplary embodiment of the present invention.

Referring to FIG. 3, when the call receipt event in the portable terminal occurs (step 310) (here, the call receipt event indicates the case in which the event for alerting the incoming call such as the ring tone, vibration, the flushing lamp, or the screen display that signals the incoming call is generated in the portable device), the following step is performed.

When the data output is detected from the posture detecting sensor of the portable terminal (step 320), i.e., detecting the movement of the portable terminal, the output data of the posture detecting sensor is analyzed (step 330).

Next, when the analysis result of the output data of the posture detecting sensor indicates the user' motion of bringing the portable terminal to the user's ear or the state in which the portable terminal is brought and placed to the user's ear for call receipt (step 340), the controller connects the call (step 360).

If the data output is not detected by the posture detecting sensor of the portable terminal (step 320) but the SEND button is detected to be pressed (step 350), the controller connects the call (step 360).

When, although the data output is detected by the posture detecting sensor of the portable terminal (step 320), the analysis result of the output data of the posture detecting sensor does not indicate the user' motion of bringing the portable terminal to the user's ear or the state in which the portable terminal is brought and placed to the user's ear for call origination (step 340) but indicates the SEND button being pressed (step 350), the controller connects the call (step 360).

Next, the following description will discuss the accelerometer sensor and the luminance sensor as an exemplary embodiment of the posture detecting sensor.

Figure 4:
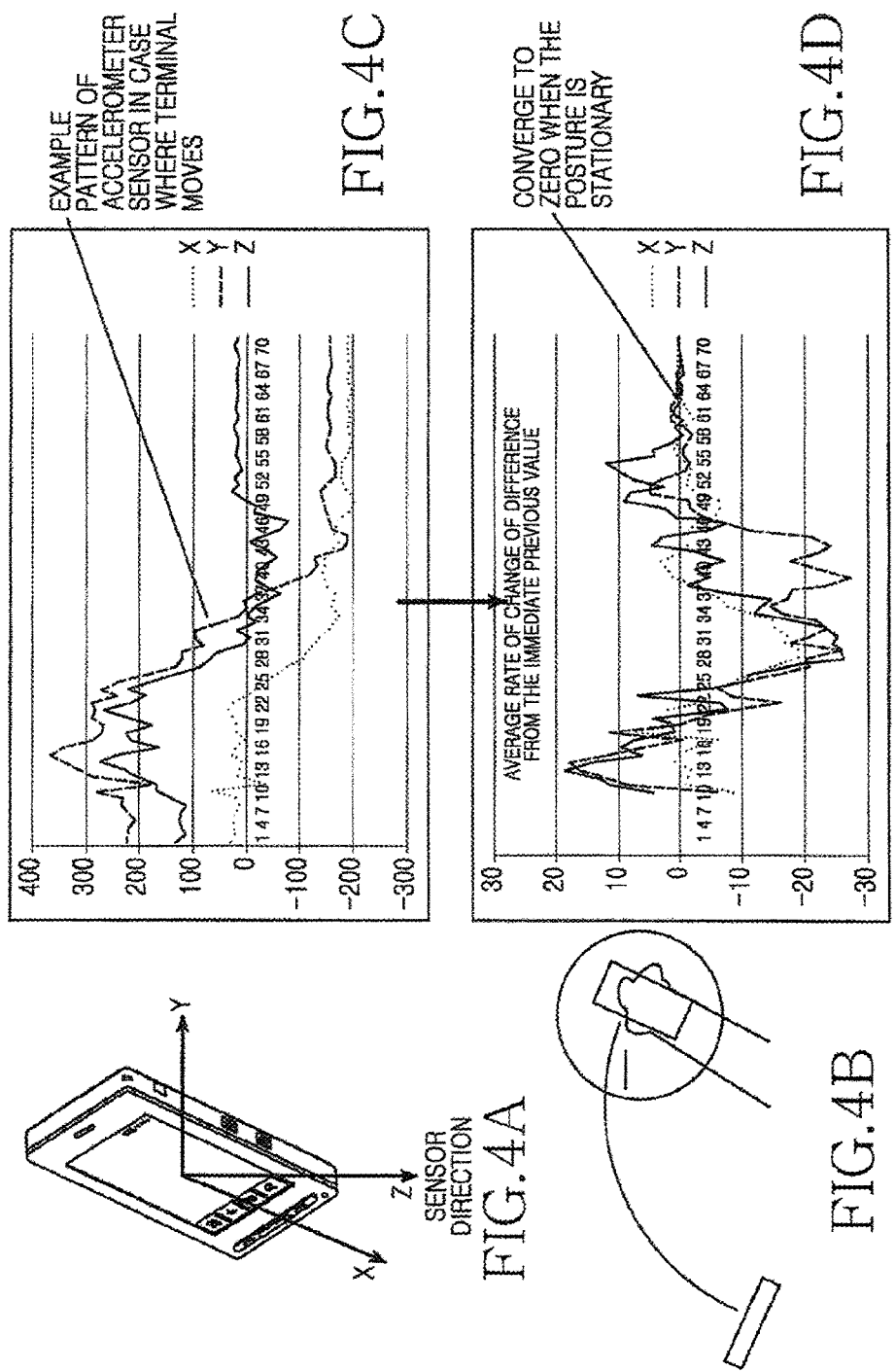
FIG. 4(a) is a view illustrating a direction of an accelerometer sensor according to an exemplary embodiment of the present invention.
FIG. 4(b) is a view illustrating a user's motion of bringing a portable terminal to the user's ear.
FIG. 4(c) is a graph illustrating a determination value of an accelerometer sensor when a user brings a portable terminal to the user's ear.
FIG. 4(d) is a view illustrating an average rate of change of a determination value of an accelerometer sensor when a user brings a portable terminal to the user's ear.

FIG. 4(*a*) is a view illustrating a direction of an accelerometer sensor according to an exemplary embodiment of the present invention, FIG. 4(*b*) is a view illustrating a user's motion of bringing a portable terminal to the user's ear, FIG. 4(*c*) is a graph illustrating a determination value of an accelerometer sensor when a user brings a portable terminal to the user's ear, and FIG. 4(*d*) is a view illustrating an average rate of change of a determination value of an accelerometer sensor when a user brings a portable terminal to the user's ear.

Referring to FIG. 4*a*, when it is assumed that an upward direction of the portable terminal is north, a value of a sensor on an X axis represents a determined acceleration value of the accelerometer sensor along a north-south direction relative to the portable terminal, and a value of a sensor on a Y axis represents a determined acceleration value of the accelerometer sensor along an east-west direction relative to the portable terminal, and a value of a sensor on a Z sensor represents a determined acceleration value of the accelerometer sensor along a vertical direction of the portable terminal.

Referring to FIG. 4*b*, a motion of the user to bring the portable terminal, placed on a flat plane, to the user's ear is illustrated. While an upper arm from a shoulder to an elbow maintains a predetermined angle, a lower arm mostly from the user's elbow to a hand is raised upwardly above the shoulder such that the portable terminal gripped in the hand is brought to the user's ear.

Referring to FIG. 4*c*, a determination value of the accelerometer sensor in a case where the user brings the user mobile terminal to the user's ear is shown, wherein a horizontal axis represents time and a vertical axis represents an acceleration of gravity (G). For reference, a conversion formula of the acceleration of gravity is $G=((x, y \text{ or } z)-512)/(512)$.

In FIG. 4*c*, a range in which values on the X, Y or Z axis of the accelerometer sensor shows a change corresponds to a case in which the user brings the portable terminal to the user's ear and, a range in which the values on the X, Y or Z axis shows a reduced change corresponds to a case in which the portable terminal is placed and remains to the user's ear.

Referring to FIG. 4*d*, an average rate of change in the determination value of the accelerometer sensor in a case where the user brings the user mobile terminal to the user's ear is shown, and a range in which the average rate of change of the determination value on the X, Y or Z axis is changed indicates a motion in which the user brings the portable terminal to the user's ear, and a range in which the change in the determination value on the X, Y or Z axis is decreased and converged to zero indicates a state in which the user places and holds the portable terminal to the user's ear.

Referring to FIGS. 4*c* and 4*d*, the portable terminal is moved when the user brings the portable terminal to the user's ear so that the determined acceleration value is changed. However, when the user places the portable terminal to the user's ear, the determined acceleration value is hardly changed.

Figure 5:
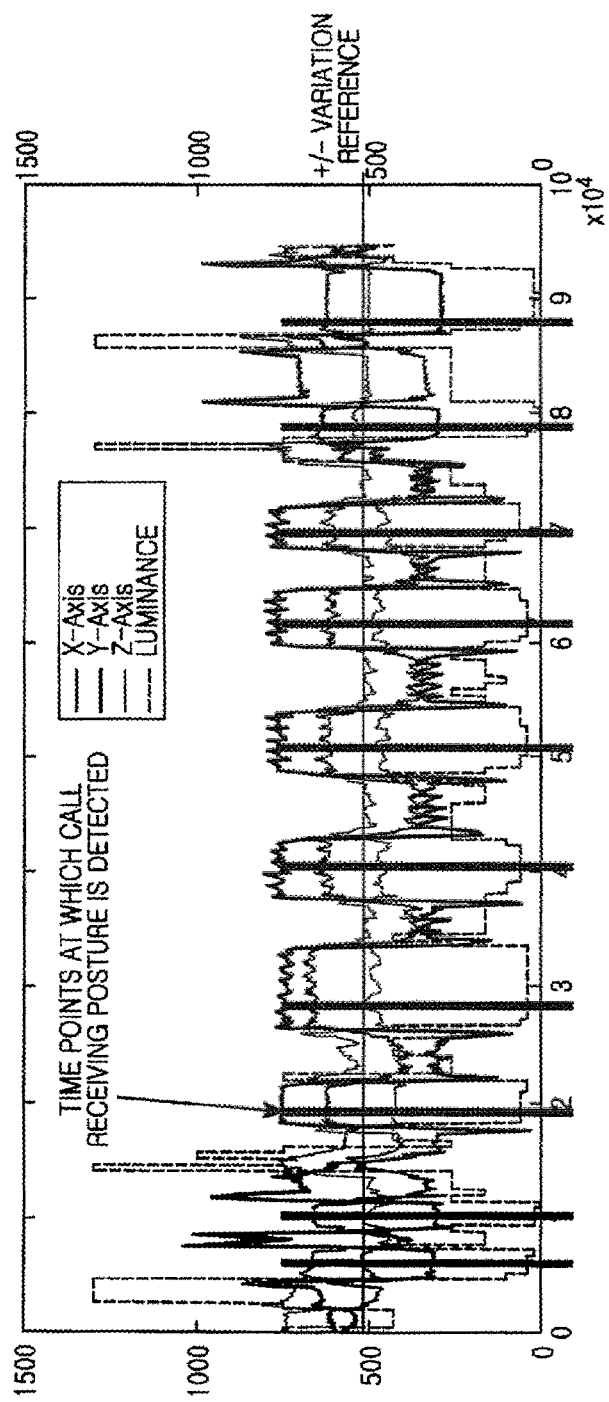
FIG. 5 is a graph illustrating an example of determination values of an accelerometer sensor and a luminance sensor and an analysis thereof when a user brings a portable terminal to the user's ear according to an exemplary embodiment of the present invention.

FIG. 5 is a graph illustrating an example of determination values of an accelerometer sensor and a luminance sensor and an analysis thereof when a user brings a portable terminal to the user's ear according to an exemplary embodiment of the present invention.

Referring to FIG. 5, the graph shows a data obtained every 20 milliseconds (ms) from the accelerometer sensor and the luminance sensor when the user brings the portable terminal to the user's ear. In the graph, the horizontal axis represents the time, the vertical axis represents the acceleration of gravity in case for the accelerometer sensor or a luminance value in case for the luminance sensor.

A bold vertical bar in the graph represents a state in which the user brings and holds the portable terminal to the user's ear.

When the user brings the portable terminal to the user's ear, the luminance sensor is shadowed by the user's ear or a facial side of the user, and the luminance value determined is maintained as low.

During when the user brings the portable terminal to the user's ear, the determination value of the luminance sensor is changed and, at the same time, the determination value of the accelerometer sensor along the X, Y or Z axis is changed. When the user brings and holds the portable terminal to the user's ear, the determination value of the accelerometer sensor along the X, Y or Z axis and the determination value of the luminance sensor are stabilized within a specific range. When these values are determined, the controller can determine that the user brings the portable terminal to the user's ear.

It should be noted that, even when there exists no luminance sensor, the controller can determine whether the user brings the portable terminal to the user's ear based on a change in the determination value of the accelerometer sensor.

Figure 6:
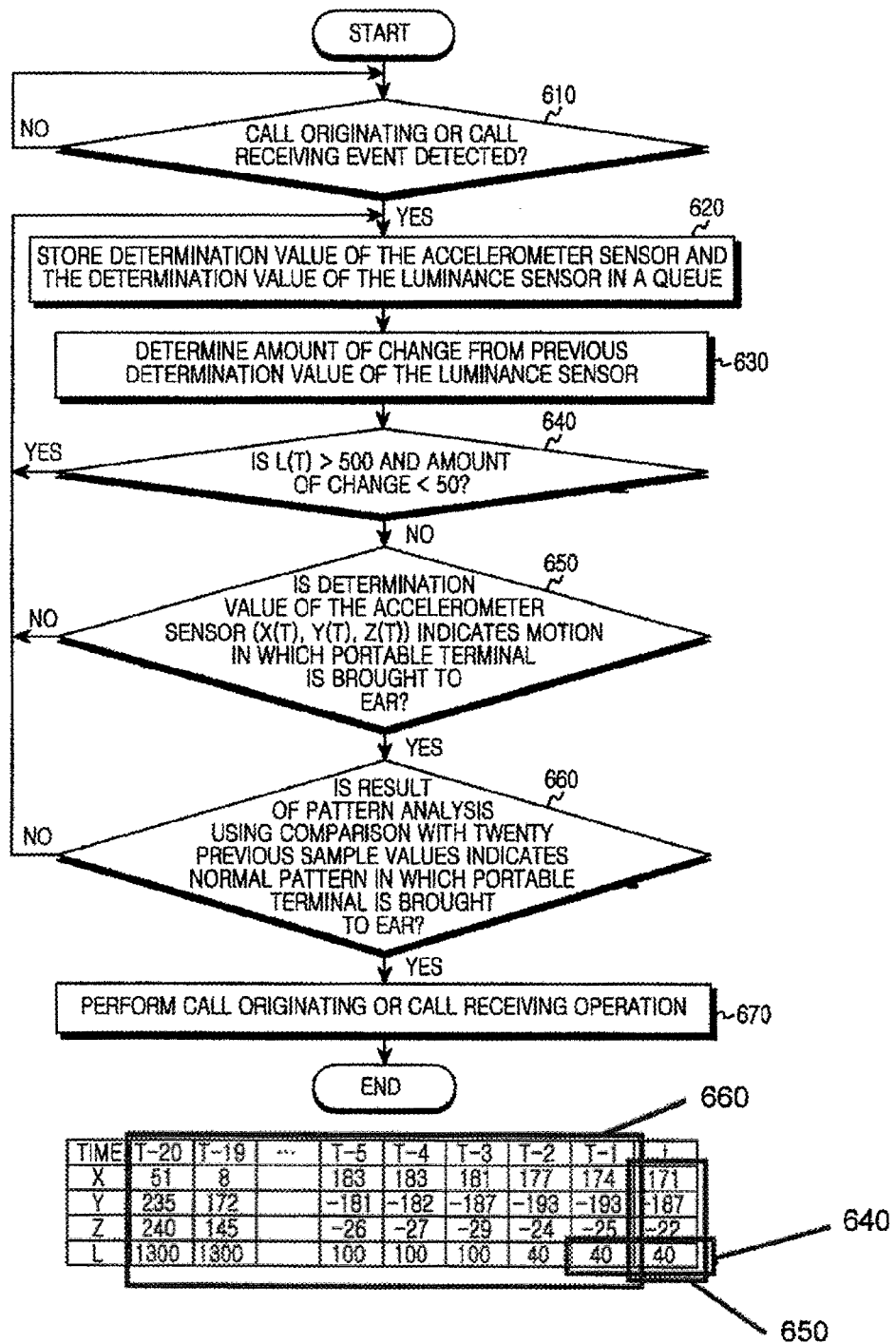
FIG. 6 is a flow chart illustrating a process of detecting a motion in which a user brings a portable terminal to the user's ear by using an accelerometer sensor and a luminance sensor in a portable terminal according to an exemplary embodiment.

FIG. 6 is a flow chart illustrating a process of detecting a motion in which a user brings a portable terminal to the user's ear by using an accelerometer sensor and a luminance sensor in a portable terminal according to an exemplary embodiment.

Referring to FIG. 6, when the controller detects the call receipt event or a call origination event (step 610), i.e., the controller detects the call receipt event such as an incoming call ringing or incoming call vibration, or the controller detects the user pressing the number to call, the following step is performed.

First, in order to determine whether the user brings holds the portable terminal to the user's ear, the controller stores the determination value (X (t), Y (t), Z (t)) of the accelerometer sensor and the determination value (L(t)) of the luminance sensor in a queue (step 620). Next, an amount of change between the determination value (L(t)) of the luminance sensor and a previous determination value (L(t−1)) of the luminance sensor is determined (step 630).

When the luminance value (L(t)) determined by the luminance sensor is greater than a specific value (for example, 500) and a difference between the luminance value (L(t)) determined by the luminance sensor and a previous luminance value (L(t−1)) is less than a specific value (for example, 50) (step 640), the controller determines that the user does not bring the portable terminal to the user's ear. To the contrary, when the luminance value (L(t)) determined by the luminance sensor is less than the specific value (for example, 500) and the difference between the luminance value (L(t)) determined by the luminance sensor and the previous determination value (L(t−1)) is greater than the specific value (for example, 50) (step 640), the controller determines that the user brings the portable terminal to the user's ear.

It is because, when it is determined that the user brings and holds the portable terminal to the user's ear, the luminance sensor is shadowed by the user's ear or facial side, and therefore, the determined brightness (L(t)) is less than the specific value (for example, 500) and the difference between the luminance value (L(t)) determined by the luminance sensor and the previous determination value (L(t−1)) is greater than the specific value (for example, 50) at a moment when the luminance sensor is shadowed. Namely, a brightness determination value of the luminance sensor is dramatically changed at the moment when the luminance sensor is shadowed.

An arrow (a) indicates a case where there is no difference between the determination value (L(t)) of the luminance sensor and the previous determination value (L(t−1)) of the luminance sensor, and therefore, the controller determines that the user does not bring and hold the potable terminal to the user's ear.

Next, the controller identifies whether an analysis result of the determination values ((X (t), Y (t), Z (t)) determined by the accelerometer sensor indicates that the user brings and holds the portable terminal to the user's ear (step 650). In this case, the controller determines whether the determination value (X (t), Y (t), Z (t)) is in a specific range and, when the determination value (X (t), Y (t), Z (t)) is in the specific range, the controller determines that the user brings and holds the portable terminal to the user's ear. To the contrary, when the determination value (X (t), Y (t), Z (t)) determined by the accelerometer sensor is not in the specific range, the controller determines that the user does not bring and hold the portable terminal to the user's ear and stop.

An arrow (b) indicates a case where the determination value of the accelerometer sensor (X (t), Y (t), Z (t)) is respectively 174, −193 and −25 and, when the determination value (X (t), Y (t), Z (t)) is in the specific range, the controller determines that the user brings and holds the portable terminal to the user's ear. The specific value or specific range will be described in FIGS. 7 and 8 below.

Next, the controller analyzes by comparing twenty previous sample values of the determination value of the accelerometer sensor or the determination value of the luminance sensor with a predefined reference value to determine whether the analysis results indicates a normal pattern in which the portable terminal is brought to the user's ear (step 660).

An arrow (c) shows the twenty previous sample values, and an algorithm such as time series can be used for comparison and analysis.

In the above analysis process, when all the results of the analysis of the determination values of the luminance sensor (step 640), the analysis of the determination value of the accelerometer sensor (step 650), and the analysis of a pattern analysis (step 670) indicate that the user brings and holds the portable terminal to the user's ear, the controller performs a call originating operation or a call receiving operation (step 670).

In other words, only when all three analysis results indicate that the user brings and holds the portable to the user's ear for call receipt or call origination, the controller performs a step to originate or receive the call.

However, considering another embodiment, it is possible that the call is originated or received when at least one analysis result of the three analyses indicates that the user brings and holds the portable terminal to the user's ear.

FIG. 7 is a view illustrating a pseudo code for detecting a motion in which a user brings a portable terminal to the user's ear by using an accelerometer sensor and a luminance sensor in a portable terminal according to an exemplary embodiment.

Referring to FIG. 7, when the call receipt event such as the screen display that signals the incoming call, the ring tone, the vibration, or the flashing lamp occurs in the portable terminal, (if (phone call signal detected)), the controller performs a process to detect whether the user brings and holds the portable terminal to the user's ear and, if detected, the controller operates a call receiving function (the phone call function).

The above process to detect whether the user brings and holds the portable terminal to the user's ear is continuously performed until the call is disconnected or the user presses a button on the portable terminal (a call is missing or user catch a call by pushing a button).

Here, the process of detecting whether the user brings and holds the portable terminal to the user's ear can include a three step process including a step of using the luminance sensor, a step of using the accelerometer sensor, and a step of using the pattern analysis. The three step detecting process is described below.

First, the determination value (X (t), Y (t), Z (t)) of the accelerometer sensor and the determination value (L(t)) of the luminance sensor are obtained (X(t)=x axis accelerometer data, Y(t)=y axis accelerometer data, Z(t)=z axis accelerometer data, L(t)=luminance sensor data).

Next, a difference (A=L(t)−L(t−5)) between the determination value (L(t)) of the luminance sensor and the previous determination value (L(t−1)) of the luminance sensor is determined. The purpose of this is to identify whether the user brings and holds the portable terminal to the user's ear by using the difference between the determination value of the luminance sensor and the previous determination value of the luminance sensor.

If the user brings the portable terminal to the user's ear such that the luminance sensor is shadowed by the user's ear or facial side, the previous determination value (L(t−5)) of the luminance sensor becomes greater than the determination value (L(t)) of the luminance sensor. After the user brings the portable terminal to the user's ear, the luminance sensor is shadowed by the user's ear or facial side so that a determined luminance value becomes smaller.

In the present invention, it is identified whether the difference (A=L(t)−L(t−5) between the determination value (L(t)) of the luminance sensor and the previous determination value (L(t−1)) of the luminance sensor is greater than LUMINANCE_DELTA_LIMIT and whether the determined luminance value (L(t)) is less than LUMINANCE_PERFORMANCE to determine whether the user brings the portable terminal to the user's ear.

Here, LUMINANCE_DELTA_LIMIT is a reference value for the difference between the determination value of the luminance sensor and the previous determination value of the luminance sensor when the user brings the portable terminal to the user's ear. LUMINANCE_PERFORMANCE is a reference luminance value for when the luminance sensor is shadowed by the user's ear or facial side.

When it is determined that the analysis result of the determination value of the luminance sensor indicates that the user brings and holds the portable terminal to the user's ear, the controller identifies whether the determination value of the accelerometer sensor that is lastly determined indicates that the user brings and holds the portable terminal to the user's ear.

When it is assumed that the portable terminal is placed on a flat plane and an upward direction of the portable terminal is north, the value of the sensor on the X axis represents the determined acceleration value of the accelerometer sensor along the north-south direction relative to the portable terminal, and the value of the sensor on the Y axis represents the determined acceleration value of the accelerometer sensor along the east-west direction relative to the portable terminal, and the value of the sensor on the Z sensor represents the determined acceleration value of the accelerometer sensor along the vertical direction of the portable terminal.

In the present invention, when the determination value X (t) of the accelerometer sensor is greater than zero and an absolute value of Z (t) is less than 100 (If (X (t)>0 and |Z(t)|<100)), the controller determines that the user brings and holds the portable terminal to the user's ear. Here, the value of X(t) and the range of |Z(t)| have the specific value and the specific range of the determination value (X(t), Y(t), Z(t)) determined by the accelerometer sensor of FIGS. 5 and 6.

Initial values of LUMINANCE_DELTA_LIMIT, lUMINANCE_PERFORMANCE, the specific value and the specific range can be pre-set by a manufacturer or a business provider. Also, an average of determination values corresponding to a uesr's motion of bringing and holding the portable terminal to the user's ear can be set as the reference value. In other words, the reference value can be adaptively set through learning.

When it is determined that the analysis result of determination value of the accelerometer sensor indicates that the user brings and holds the portable terminal to the user's ear, the controller identifies whether the user brings the portable terminal to the user's ear by using the pattern analysis.

The above pattern analyzing process is to identify whether the user's motion is a normal behavior of brining the portable terminal to the user's ear by comparing the determination values of (X(t−20, t), Y(t−20, t), Z(t−20, t)) of the accelerometer sensor with a given pattern. The given pattern can be an average value of previous determination values, or a learned value, or a standardized value.

For example, when a pattern similar to or same with a pattern that is determined to be the user's motion to bring the portable terminal to the user's ear is detected, the controller can determine that the user's motion is the normal behavior of brining the portable terminal to the user's ear.

When it is determined, based on the result of the pattern analysis, that the user brings and holds the portable terminal to the user's ear, the controller performs a phone receiving step (or phone call function).

FIG. 8 is a view illustrating a pseudo code for detecting a motion in which a user brings a portable terminal to the user's ear by using an accelerometer sensor in a portable terminal according to an exemplary embodiment.

Referring to FIG. 8, when the call receipt event such as the screen display that signals the incoming call, the ring tone, the vibration, or the flashing lamp occurs in the portable terminal, (if (phone call signal detected)), the controller performs a process to detect whether the user brings and holds the portable terminal to the user's ear and, if detected, the controller operates a call receiving function (the phone call function).

The process to detect whether the user brings and holds the portable terminal to the user's ear is continuously performed until the call is disconnected or the user presses a button on the portable terminal.

Here, a process of detecting whether the user brings and holds the portable terminal to the user's ear can be a two step process including a step of using the accelerometer sensor and a step of using the pattern analysis. The two step detecting process is described below.

First, the controller identifies whether the user brings and holds the portable terminal to the user's ear by using a determined value of the accelerometer sensor.

During when the user grips and brings the portable terminal to the user's ear, an acceleration value is changed, and, when the user finishes the motion of bringing the portable terminal to the user's ear, the change in the acceleration value is stabilized.

To detect these changes, the controller repeats a process of subtracting a previous determined value from the determined value of the accelerometer sensor. For example, a process such as (|X(5)−X(4)|), (|Y(5)−Y(4)|), (Z(5)−Z(4)|)), ((|X(4)−X(3)|), (|Y(4)−Y(3)|), or (|Z (4)−Z (3)|)) is repeated.

Next, the subtracted value is added with respect to each axis. For example, a process such as dX=SUM (|X(|X(t−1) |), dY=SUM (|Y(t)−Y(t−1)|), or dZ=SUM (|Z(t)−Z(t−1)|) is performed.

Next, a standard deviation for dX, dY and dZ values are obtained and whether the standard deviation is less than STABLE_LIMIT is identified so that the controller can determine whether the user brings the portable device to the user's ear.

Here, STABLE_LIMIT indicates a reference standard deviation for a stabilized acceleration determination value when the user finishes the motion of brining the portable terminal to the user's ear.

Next, when a result of comparison between the standard deviation indicates that the user brings the portable terminal to the user's ear, the controller identifies whether the determination value of the accelerometer sensor lastly determined indicates the state in which the user brings and holds the portable terminal to the user's ear.

When it is assumed that the portable terminal is placed on a flat plane and an upward direction of the portable terminal is north, the value of the sensor on the X axis represents the determined acceleration value of the accelerometer sensor along the north-south direction relative to the portable terminal, and the value of the sensor on the Y axis represents the determined acceleration value of the accelerometer sensor along the east-west direction relative to the portable terminal, and the value of the sensor on the Z sensor represents the determined acceleration value of the accelerometer sensor along the vertical direction of the portable terminal.

In the present invention, when the determination value X (t) of the accelerometer sensor is greater than zero and an absolute value of Z (t) is less than 100 (If (X (t)>0 and |Z (t)|<100)), the controller determines that the user brings and holds the portable terminal to the user's ear. Here, the value of X(t) and the range of |Z(t)| have the specific value and the specific range of the determination value (X(t), Y(t), Z(t)) determined by the accelerometer sensor of FIGS. 5 and 6.

Initial values for STABLE_LIMIT, the specific value or the specific range can be pre-set by the manufacturer or the business provider. Also, the average of the determination values corresponding to the user's motion of bringing and holding the portable terminal to the user's ear can be set as a reference value of STABLE_LIMIT. In other words, the reference value can be adaptively set through learning.

When it is determined that the analysis result of determination value of the accelerometer sensor indicates that the user brings and holds the portable terminal to the user's ear, the controller identifies whether the user brings the portable terminal to the user's ear by using the pattern analysis.

The above pattern analyzing process is to identify whether the user's motion is a normal behavior of brining the portable terminal to the user's ear by comparing the determination values of (X(t−20, t), Y(t−20, t), Z(t−20, t)) of the accelerometer sensor with a given pattern. The given pattern can be an average value of previous determination values, or the learned value, or the standardized value.

For example, when a pattern similar to or same with a pattern that is determined to be the user's motion to bring the portable terminal to the user's ear is detected, the controller can determine that the user's motion is the normal behavior of brining the portable terminal to the user's ear.

When it is determined, based on the result of the pattern analysis, that the user brings and holds the portable terminal to the user's ear, the controller performs the phone receiving step (or phone call function).

It is described in FIGS. 7 and 8 that a method of detecting the user's motion to bring and hold the portable terminal is described in case for the call reception; however, the above method can equally apply to detect the user's motion to bring and hold the portable terminal to the user's ear for the call origination. Namely, when the telephone number is entered and the controller detects the above described step, the call can be originated to the entered phone number.

The present invention can provide convenience to the user by automatically receiving or originating a call by detecting a motion in which the user brings the portable terminal to the user's ear.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of an electronic device, the method comprising:
    identifying a phone number to call;
    detecting a motion of the electronic device using a sensor of the electronic device;
    identifying that the detected motion corresponds to a phone-call posture; and
    initiating a call to the phone number based at least on the identifying that the detected motion corresponds to the phone-call posture.

2. The method of claim 1, wherein initiating the call to the phone number further comprises identifying that the detected motion which is detected for a designated period of time corresponds to a predetermined motion for the phone-call posture.

3. The method of claim 1, wherein initiating the call to the phone number comprises initiating the call to the phone number, based at least on the detected motion which is completed within a designated period of time being matched with a motion for the phone-call posture.

4. The method of claim 1, wherein detecting the motion of the electronic device further comprises acquiring values of the sensor from the sensor, and
    wherein initiating the call to the phone number comprises initiating the call to the phone number, based at least on the values acquired for a designated period of time corresponding to predetermined values of the sensor for the phone-call posture.

5. The method of claim 4, wherein acquiring the values of the sensor from the sensor comprises:
    acquiring the values of the sensor from the sensor for the designated period of time immediately before the values of the sensor reach a preset value of the sensor.

6. The method of claim 4, wherein initiating the call to the phone number, based at least on the values acquired for the designated period of time corresponding to predetermined values of the sensor for the phone-call posture comprises:
    initiating the call to the phone number, based at least on a change of the values acquired for the designated period of time corresponding to a change of the predetermined values of the sensor for the phone-call posture.

7. The method of claim 6, wherein acquiring the values of the sensor from the sensor comprises:
    acquiring the values of the sensor from the sensor for the designated period of time immediately before the change of the values of the sensor reaches a preset change.

8. The method of claim 1, wherein the sensor comprises at least one of an accelerometer sensor, a terrestrial magnetic sensor, a pressure sensor, a proximity sensor, or a luminance sensor.

9. The method of claim 1, wherein the motion of the electronic device for the phone-call posture is an upwardly rotated motion.

10. The method of claim 1, further comprising detecting an event indicating that the phone number is inputted before identifying the phone number to call.

11. An electronic device comprising:
a memory storing instructions; and
at least one processor configured to execute the instructions to at least:
control to identify a phone number to call,
control to detect a motion of the electronic device using a sensor of the electronic device,
control to identify that the detected motion corresponds to a phone-call posture, and
control to initiate a call to the phone number based at least on identifying that the detected motion corresponds to the phone-call posture.

12. The electronic device of claim 11, wherein the at least one processor is further configured to identify that the detected motion which is detected for a designated period of time corresponds to a predetermined motion for the phone-call posture.

13. The electronic device of claim 11, wherein the at least one processor is configured to control to initiate the call to the phone number, based at least on the detected motion which is completed within a designated period of time being matched with the motion for the phone-call posture.

14. The electronic device of claim 11, wherein the at least one processor is further configured to acquire values of the sensor from the sensor, and
wherein the at least one processor is configured to control to initiate the call to the phone number, based at least on the values acquired for a designated period of time corresponding to predetermined values of the sensor for the phone-call posture.

15. The electronic device of claim 14, wherein the at least one processor is configured to control to acquire the values of the sensor from the sensor for the designated period of time immediately before the values of the sensor reach a preset value of the sensor.

16. The electronic device of claim 14, wherein the at least one processor is further configured to control to initiate the call to the phone number, based at least on a change of the values acquired for the designated period of time corresponding to a change of the predetermined values of the sensor for the phone-call posture.

17. The electronic device of claim 16, wherein the at least one processor is further configured to control to acquire the values of the sensor from the sensor for the designated period of time immediately before the change of the values of the sensor reaches a preset change.

18. The electronic device of claim 11, wherein the sensor comprises at least one of an accelerometer sensor, a terrestrial magnetic sensor, a pressure sensor, a proximity sensor, or a luminance sensor.

19. The electronic device of claim 11, wherein the motion of the electronic device for the phone-call posture is an upwardly rotated motion.

20. The electronic device of claim 11, wherein the at least one processor is further configured to detect an event indicating that the phone number is inputted before identifying the phone number to call.

* * * * *